(12) United States Patent
Garney et al.

(10) Patent No.: US 7,587,717 B2
(45) Date of Patent: *Sep. 8, 2009

(54) DYNAMIC MASTER/SLAVE CONFIGURATION FOR MULTIPLE EXPANSION MODULES

(75) Inventors: John I. Garney, Portland, OR (US); Robert J. Royer, Jr., Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/559,040

(22) Filed: Nov. 13, 2006

(65) Prior Publication Data

US 2007/0088884 A1    Apr. 19, 2007

Related U.S. Application Data

(62) Division of application No. 09/963,184, filed on Sep. 25, 2001, now Pat. No. 7,152,125.

(51) Int. Cl.
*G06F 9/46* (2006.01)
*G06F 3/00* (2006.01)
*G06F 3/06* (2006.01)
*G06F 13/00* (2006.01)
*G06F 13/14* (2006.01)
*G06F 13/24* (2006.01)

(52) U.S. Cl. ............... 718/100; 710/2; 710/5; 710/8; 710/38; 710/48; 710/62; 710/64; 710/72; 710/104; 710/110; 710/120; 710/260; 710/261; 710/266; 710/300; 710/301; 710/302; 710/303; 710/304; 710/305; 710/306; 712/31; 712/214; 700/3

(58) Field of Classification Search ............ None
See application file for complete search history.

(56) References Cited

U.S. PATENT DOCUMENTS

| | | | |
|---|---|---|---|
| 4,240,143 A | 12/1980 | Besemer et al. ............. 710/104 |
| 5,437,039 A | 7/1995 | Yuen ........................... 718/108 |
| 5,517,650 A | 5/1996 | Bland et al. ................. 713/323 |
| 5,805,842 A | 9/1998 | Nagaraj et al. .............. 710/313 |
| 5,838,950 A | 11/1998 | Young et al. .................. 703/21 |
| 5,856,921 A | 1/1999 | Kim et al. ....................... 700/3 |
| 5,870,301 A | 2/1999 | Yakushiji et al. ............... 700/3 |
| 5,915,103 A | 6/1999 | Chambers et al. ........... 710/313 |
| 5,930,487 A | 7/1999 | Story et al. .................. 710/120 |
| 5,983,303 A | 11/1999 | Sheafor et al. .............. 710/315 |
| 6,011,921 A | 1/2000 | Takahashi et al. ............. 710/48 |
| 6,055,180 A | 4/2000 | Gudesen et al. |
| 6,185,639 B1 | 2/2001 | Kailash et al. ................. 710/48 |
| 6,219,727 B1 | 4/2001 | Kailash et al. ................. 710/48 |
| 6,340,600 B1 | 1/2002 | Joo et al. ......................... 438/3 |
| 6,356,969 B1 | 3/2002 | DeKoning et al. .......... 710/261 |
| 6,385,683 B1 | 5/2002 | DeKoning et al. .......... 710/261 |

(Continued)

*Primary Examiner*—Tanh Q Nguyen
(74) *Attorney, Agent, or Firm*—Marger Johnson & McCollom, P.C.

(57) ABSTRACT

A computing system having expansion modules. One of the expansion modules is identified as a master module. The other modules act as slaves to the master module. The central processing unit routes a task to either the master module for portioning out or to all of the expansion modules. The master module then receives completion signals from all of the active slave modules and then provides only one interrupt to the central processing unit for that task.

6 Claims, 2 Drawing Sheets

U.S. PATENT DOCUMENTS

| | | | |
|---|---|---|---|
| 6,598,107 B1 | 7/2003 | von der Wense et al. | 710/305 |
| 6,756,620 B2 | 6/2004 | Li et al. | 257/295 |
| 6,769,035 B1 | 7/2004 | Garreau | 710/14 |
| 6,864,896 B2 | 3/2005 | Perego | 345/542 |
| 2003/0018824 A1 | 1/2003 | Ponticelli | 709/253 |
| 2004/0199690 A1 | 10/2004 | Horowitz et al. | 710/104 |

DYNAMIC MASTER/SLAVE CONFIGURATION FOR MULTIPLE EXPANSION MODULES

This application is a division of and claims priority to prior application Ser. No. 09/963,184 filed Sep. 25, 2001, now U.S. Pat. No. 7,152,125 which issued Dec. 19, 2006.

BACKGROUND

1. Field

This disclosure relates to expansion modules used in computing systems, more particularly to techniques to manage modules configurations.

2. Background

Typical computer systems, such as personal computers, have moved to a more modular architecture, with components that can be easily added and removed. In many instances, these components are on modules, relatively small printed circuit boards with a connector on one end. Alternatively, they may be wired directly into the main system board or 'motherboard.' These modules, whether insertable or wired, will be referred to here as expansion modules. The connector allows the module to be 'plugged in' to the main processor board along a communication bus that allows the component on the module to communicate with the main processor, or wired to the board.

Typically, a defined protocol is used to handle communications between the central processing unit and the expansion module, such as the peripheral component interface (PCI) protocol. The PCI protocol describes the framework used to manage these communications and the bus traffic, although other types of protocols are available. Any type of system expansion bus may have expansion modules.

Using the example of PCI modules, systems can be expanded to include multiple communication capabilities, such as modems and local area network modules. Peripheral devices such as printers and scanners, expansion memory and many other types of components can reside on these modules, providing a user with a system with many different possibilities. However, the main processor or central processing unit (CPU) has to manage all of the communications between these various modules.

For example, each PCI module typically has firmware running on its controller or processor that handles requests from the CPU. When the request is complete, the PCI module signals the CPU with an interrupt. This can have a negative impact on the processing speed of the system, as well as the processing efficiency. The CPU must process the interrupt, slowing its processing on other tasks. Similarly, it increases the number of processing cycles required to complete tasks, as some of the cycles are consumer answering and then canceling the interrupts from the PCI modules.

Therefore, it would seem useful if some sort of configuration were available that allowed an expansion module to act as the master or main module for a subset of other modules. This configuration would be more useful if it were also adaptable to different types of expansion modules, beyond those using PCI protocols.

BRIEF DESCRIPTION OF THE DRAWINGS

The invention may be best understood by reading the disclosure with reference to the drawings, wherein.

DETAILED DESCRIPTION OF THE EMBODIMENTS

Figure 1:
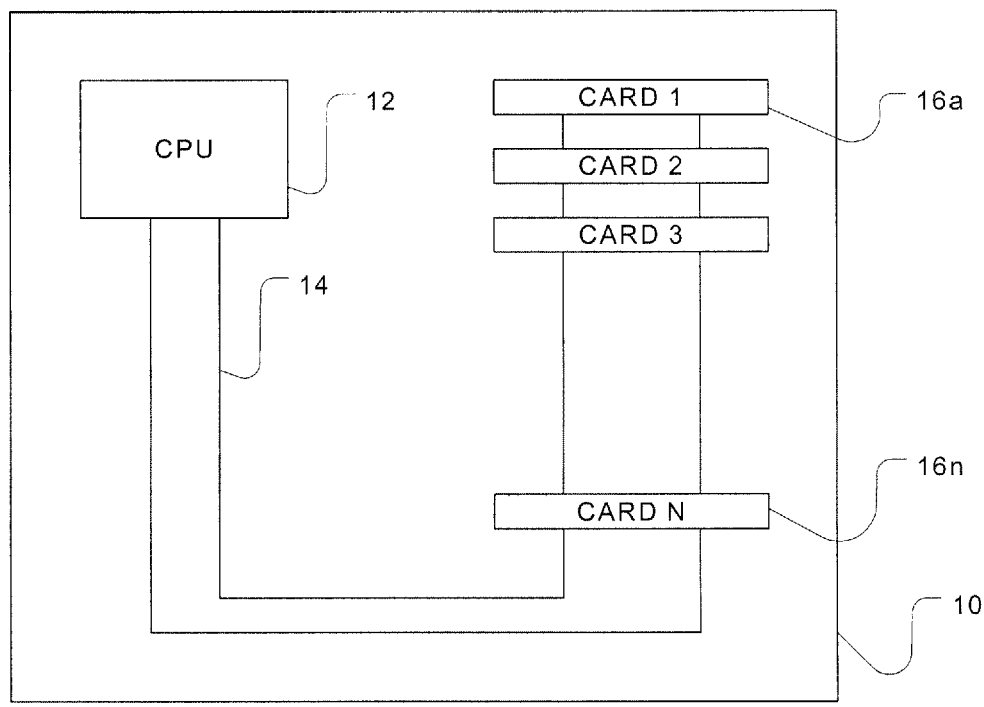
FIG. 1 shows one embodiment of a host system having several expansion modules, in accordance with the invention.

FIG. 1 shows a block diagram of a computing system having several expansion modules, in accordance with the invention. The computing system 10 may be any type of system with a central processing unit, such as a personal computer, a network server, or a portable device, as examples and may have a dedicated purpose, such as a digital music player or be a multipurpose device such as a personal computer (PC).

Similarly, the expansion modules 16a-16n may be any type of expansion module, including those that add extra components to the system such as modems, or those that expand current capabilities, such as providing extra memory. The designator 'n' as used here merely indicates an arbitrary number of expansion modules. The limitation on the number of expansion modules is only limited by the capability of the CPU to communicate with them and the capacity of the computing system to physically include them.

The CPU 12 and the various expansion modules 16a-16n communicate across the bus 14. The bus 14 may use one of many bus protocols, such as PCI or ISA (Industry Standard Architecture), or any system expansion bus. Generally, as a task is routed from the CPU to the various expansion modules, the module performs its task and then notifies the CPU of completion. This notification is typically in the form of an interrupt. The CPU responds to each interrupt. This can adversely affect system performance. One aspect of the invention is a process for managing the expansion modules and their interactions with the CPU to increase system efficiency.

Figure 2:
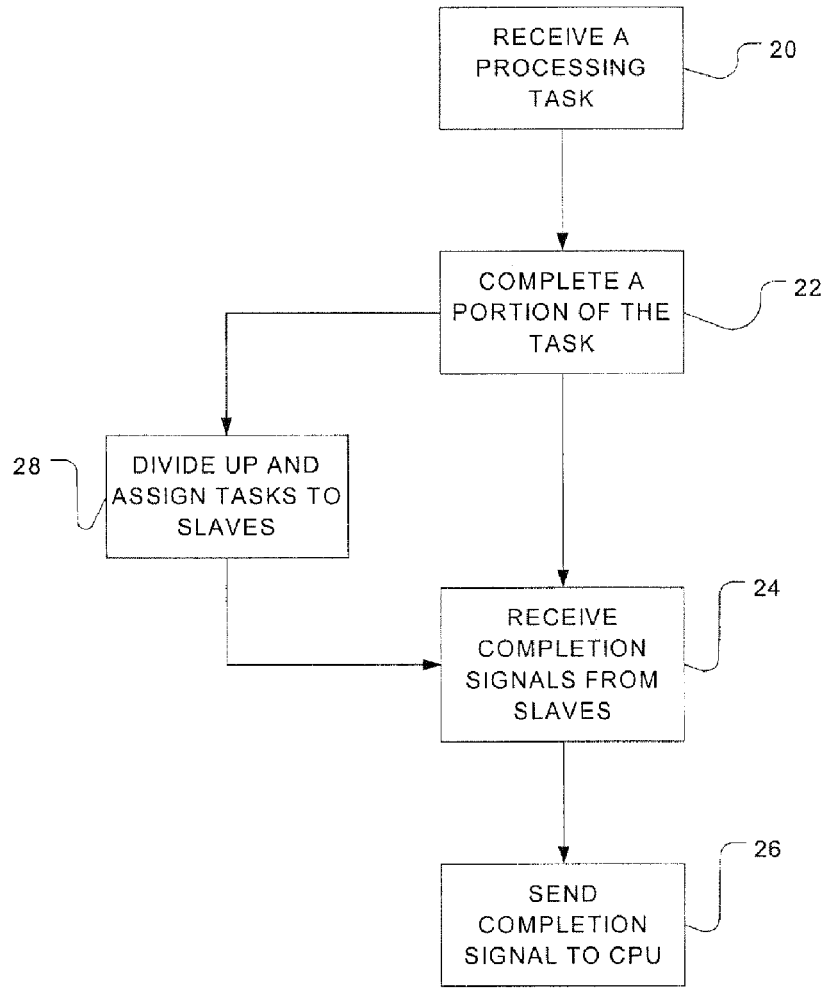
FIG. 2 shows a flowchart of one embodiment of a task process by expansion modules, in accordance with the invention.

FIG. 2 shows one embodiment of a process wherein the expansion modules handle a command request for the CPU in a master/slave relationship, in accordance with the invention. At 20, the expansion modules receive a processing task. As will be discussed further, the manner in which these tasks are assigned may take one of many forms, including having the master module distribute the tasks, and having the CPU assign the tasks with or without the master module. Initially, the discussion will address processing the task at each module directly from the CPU.

For its part the master module will typically process that portion of the task assigned to it, such as is shown at 22. After completing its portion of the task, the master module then waits until the slave modules report back that they have completed their portion of the tasks at 24. The master module then sends the completion signal to the CPU, typically an interrupt, at 26. In this manner, the CPU is only interrupted by one module and only when all the modules have completed their processing. The CPU can then interact with each module as necessary to retrieve the information resulting from the completed portions of the task, reassembling the results into the proper format as needed by the CPU.

For example, assume the process is a memory access and the memory is spread across several memory expansion packs. The CPU will typically have a memory map that associates a given string of memory addresses with a particular module location. The CPU would then perform a memory access, where the memory access may involve several modules. When all of the data has been accessed from the various memories on the modules, the slave modules would send the signals to the master module indicating that the data is available and the master module would contact the CPU to allow the CPU to receive the data across the bus.

In an alternative embodiment, the master module may receive not only the completion signals at 24, but also the data resulting from each of the slave modules processing the request. In this manner, the master module acts as a single point of distribution and reassembly for the CPU. In yet another alternative, the master module may also divide up and assign the task as slaves. This is shown at 28 in FIG. 2. The decisions as to how the tasks are divided up and how they are reported back to the CPU depend largely upon the application and the intelligence resident on the modules.

In the embodiment above, the master module may have the memory map and would divide up the access processes as necessary to allow the data to be retrieved by the master module. In the former alternative embodiment, the master module may have some amount of memory resident on it as an output register into which it would accumulate the desired data. The master module would then transmit the complete data set back to the CPU.

This may be desirable for certain types of memory that are manufactured in smaller memory arrays than would otherwise be useful. One such example is a polymer ferroelectric memory array. A polymer ferroelectric memory array generally comprises a layer of polymer material sandwiched between two metal layers. The polymer material has ferroelectric properties that can be manipulated by application of electric fields. Control of voltages on the electrodes formed in the metal layers controls the polarity in the polymer material. A polarity of a certain direction is determined to be a data 'one' and of the other direction a data 'zero.'

Polymer ferroelectric memory arrays do not require any transistors for each memory cell, unlike most other memories. Therefore, they are less expensive and simpler to manufacture. However, currently these arrays are only available in smaller arrays than other types of memory. Application of this invention would allow the memory arrays to be mounted on expansion modules and accessed as if they were one expansion module through the master module, rather than several expansion modules, This is just intended as a possible example and is in no way intended to be read as a limitation on the claims.

Another consideration is that not all slaves may be necessary for completion of a particular task. As will be discussed with reference to FIG. 4, the master receives a command request from the CPU formatted in such a manner that it informs the master as to which modules are slaves for this particular task, and which are not involved. This allows the master to recognize completion of the task and the point at which an interrupt should be generated, as the master will know when it has received all of the necessary completion signals from the involved slaves.

This flexibility of configuration is extended to the designation of the master as well. The CPU may designate different master modules for different tasks. Using the example of the memory set forth above, the CPU may change the master module depending upon the address from which the data is requested or to which the data is to be rewritten. For example, module 1 may be the master for a first memory operation that involves the memory addresses residing upon that module. Other modules involved in the memory operation may be modules 4, 5 and 7. In a second memory operation, the master module may be any other module, as the memory addresses involved do not include those of module 4. Alternatively, the CPU may assign module 5 as the master and have modules 4 and 7 be the slaves for the second memory operation. Typically, there will be no predesignated master module. This adds maximum system flexibility and error recovery, if one of the modules becomes unusable for some reason.

However, the system designer may assign a master module in whatever manner desired. For example, the system may have a predesignated master module that is always the master module until it is removed from the system. The system may have a way to assign predesignated master modules for particular operations. For example, module 4 may always act as the master module for memory operations and module 6 may always act as the master module for communications operations. Alternatively, as mentioned above, the master module could be assigned each time the CPU generates a command request for the expansion modules. This is referred to here as dynamically assigning the master module. In one embodiment this does not require that the CPU apply any logic or processing power to the determination, as there could be default master module that is overridden by a particular set of circumstances.

Figure 3:
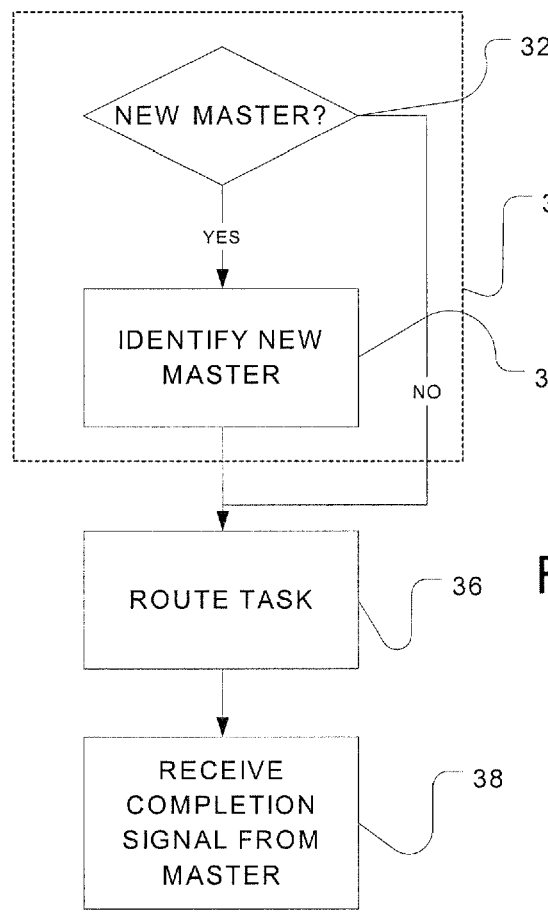
FIG. 3 shows a flow chart of one embodiment of a request from a CPU being handled by a master-slave arrangement of expansion modules, in accordance with the invention.

This can be seen in more detail with reference to FIG. 3. In FIG. 3, one embodiment of a method to generate a request from the CPU to the expansion modules. At 30, the master module is designated. As can be seen in the subprocesses of 30, this may or may not require a determination by the CPU as to whether a new master is required at 32. If a new master is required at 32, a new master is assigned at 34 and the task is routed at 36. If no new master is required at 32, the task is routed at 36. In the alternative embodiments discussed above, where the master module may be predesignated, the process of designating a master module merely becomes providing the address of the master module to the bus control logic.

Once the task is routed at 36, the CPU does not perform any further processing with regard to that task until the completion signal is received from the master at 38. As was discussed with reference to FIG. 2, the division of the tasks and the handling of both the resulting completion signals and any data gathering or transmitting is performed between the master module and the slaves.

Figure 4:
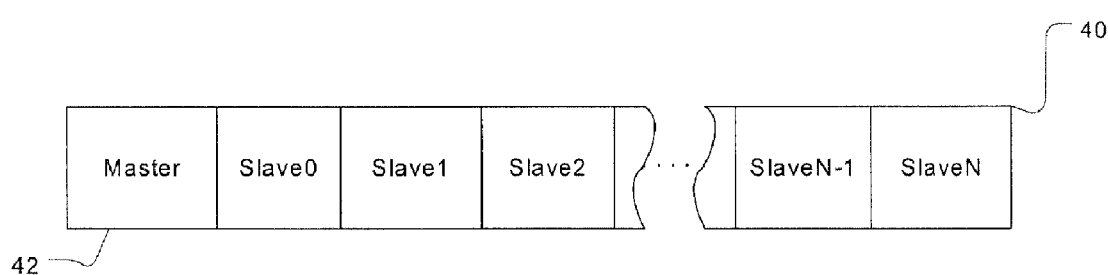
FIG. 4 shows one embodiment of a layout of a command request identifying master and slave states, in accordance with the invention.

In order to avoid adding to the processing burden of the system with the configuration information, the master/slave configuration administration can be handled as part of the command request. This is shown in FIG. 4. The format of the command 40 could include a word that identifies which module is master and which is slave by the positioning of the module address within that word. The first position 42 shown in the example would be the address of the master module, with the slave modules following. The command text would then provide information as to which slave was to perform which tasks, in the embodiments where that is determined by the CPU. Otherwise, the master module would use the designated slaves to portion out the task as necessary. This allows dynamic configuration without contributing significantly to the overhead of the system.

Embodiments may by implemented as computer-readable code stored on a computer-readable storage medium, where upon execution, the code causes the computing system to operate as described above. Additionally, although there has been described to this point a particular embodiment for a method and apparatus for configuration of expansion modules as masters and slaves, it is not intended that such specific references be considered as limitations upon the scope of this invention except in-so-far as set forth in the following claims.

What is claimed is:

1. A method of processing a task, the method comprising:

designating one module as a master module from at least two expansion modules, such that there is only one master module associated with the task, wherein at least one other module of the expansion modules becomes a slave module, and the master module is designated based upon the task;

routing a portion of the task to the master module to be performed by the master module, and at least another portion of the task to the slave module to be performed by the slave module; and receiving an interrupt from the master module when the task is completed by both the master module and the slave module, wherein routing the portion of the task to the master module and the at least another portion of the task to the slave module comprises providing master and slave information together in one command request.

2. The method of claim 1, wherein designating the one module as a master module comprises identifying one module as the master module dynamically.

3. The method of claim 1, wherein designating the one module as the master module comprises loading an address of a predesignated master module into a bus control circuitry.

4. An article of manufacture including code stored on a computer-readable storage medium, the code when executed by a computer, causes the computer to:

designate one module as a master module from at least two expansion modules, such that there is only one master module associated with a task, wherein at least one other module of the expansion modules becomes a slave module, and the master module is designated based upon the task;

route a portion of the task to the master module to be performed by the master module, and at least another portion of the task to the slave module to be performed by the slave module; and receive an interrupt from the master module when the task is completed by both the master module and the slave module, wherein the code causing the computer to route the portion of the task to the master module and the at least another portion of the task to the slave module causes the computer to provide master and slave information together in one command request.

5. The article of manufacture of claim 4, wherein the code causing the computer to designate the one module as the master module causes the computer to identify the one module as the master module dynamically.

6. The article of manufacture of claim 4, wherein the code causing the computer to designate the one module as the master module causes the computer to load an address of a predesignated master module into a bus control circuitry.

* * * * *